June 4, 1963  A. A. FOWLER, JR., ETAL  3,092,155
HORIZONTAL BAND SAW
Filed May 13, 1960  2 Sheets-Sheet 1

INVENTORS
Aubrey A. Fowler, Jr. &
Henry O. McKee

BY
ATTORNEY

June 4, 1963 A. A. FOWLER, JR., ETAL 3,092,155
HORIZONTAL BAND SAW
Filed May 13, 1960 2 Sheets-Sheet 2
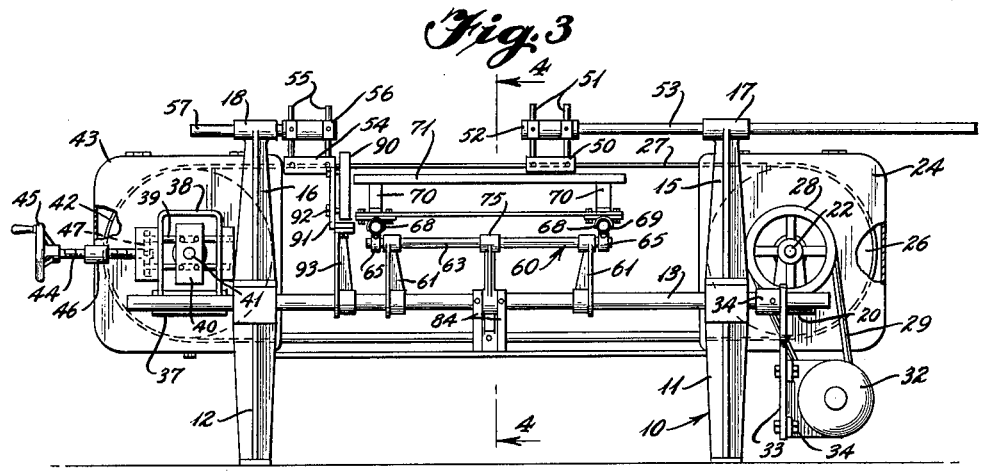
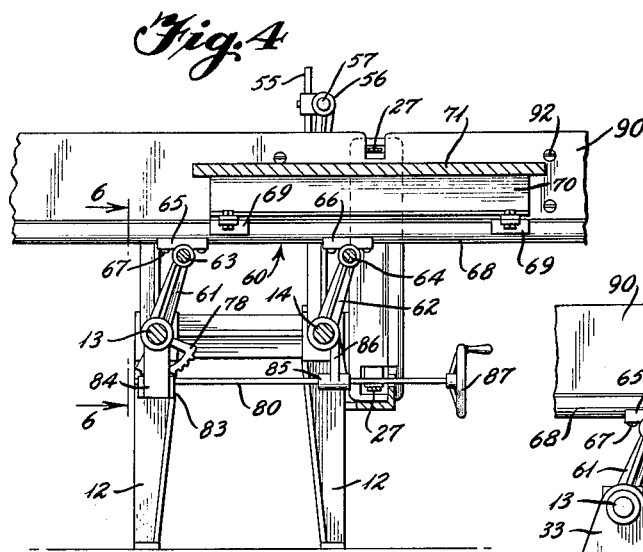
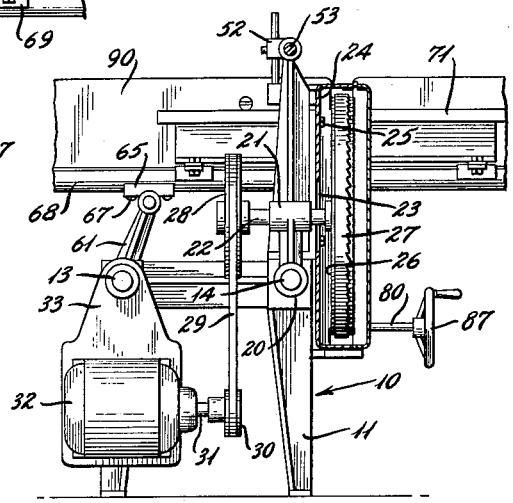
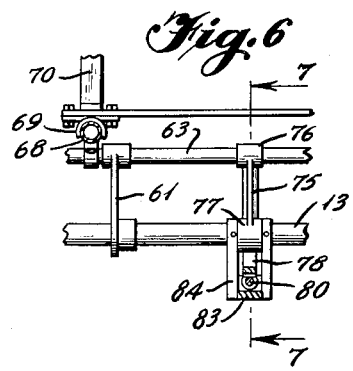
INVENTORS
Aubrey A. Fowler, Jr. &
Henry O. McKee
BY
ATTORNEY

United States Patent Office 3,092,155
Patented June 4, 1963

3,092,155
HORIZONTAL BAND SAW
Aubrey A. Fowler, Jr., and Henry O. McKee,
203 Morro St., both of Fairmont, N.C.
Filed May 13, 1960, Ser. No. 29,051
4 Claims. (Cl. 143—19)

This invention relates to saws of various kinds including power driven, to the manner of supporting work to be cut by such saws, and to the combination of saws and work holders utilized in performing work desired to be done.

The invention relates particularly to a combination horizontally disposed band saw with a motor for driving the same and means for supporting work and including a frame supported work table having a work supporting surface both horizontally and vertically movable.

Heretofore saws of various kinds, including horizontally disposed band saws, and adjustable work supports have been provided but these have been of limited use and required the movement of the work across the work supporting surface of the work table.

It is an object of the invention to provide a composite structure including a horizontally disposed band saw, a motor for driving the same, and a table for supporting the work capable of being moved with the work both vertically and horizontally to present the work to the saw at right angles thereto but without moving the work relative to the table.

Another object of the invention is to provide a practical machine of the character indicated with controls by which an operator can readily make the necessary adjustments for raising and lowering the work supporting surface and in which the table with the work thereon can easily be moved relative to the saw to perform the cutting operation.

Figure 1:
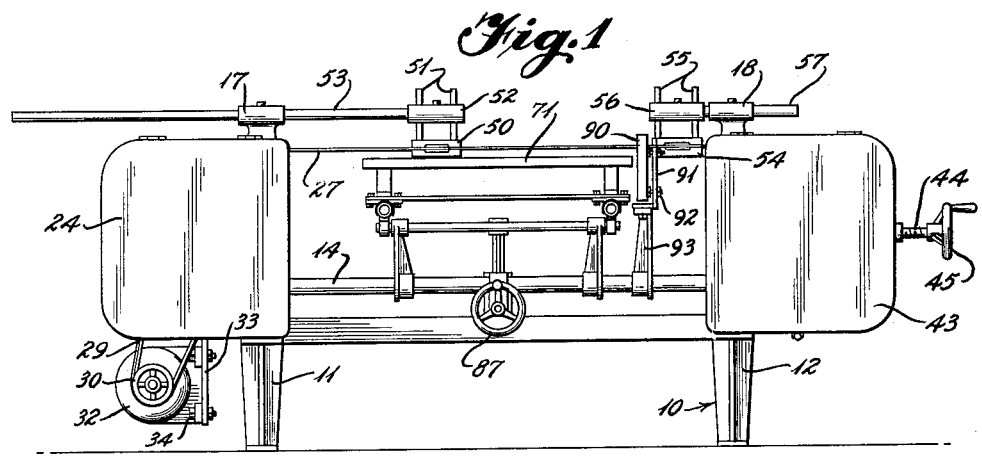
Figure 2:
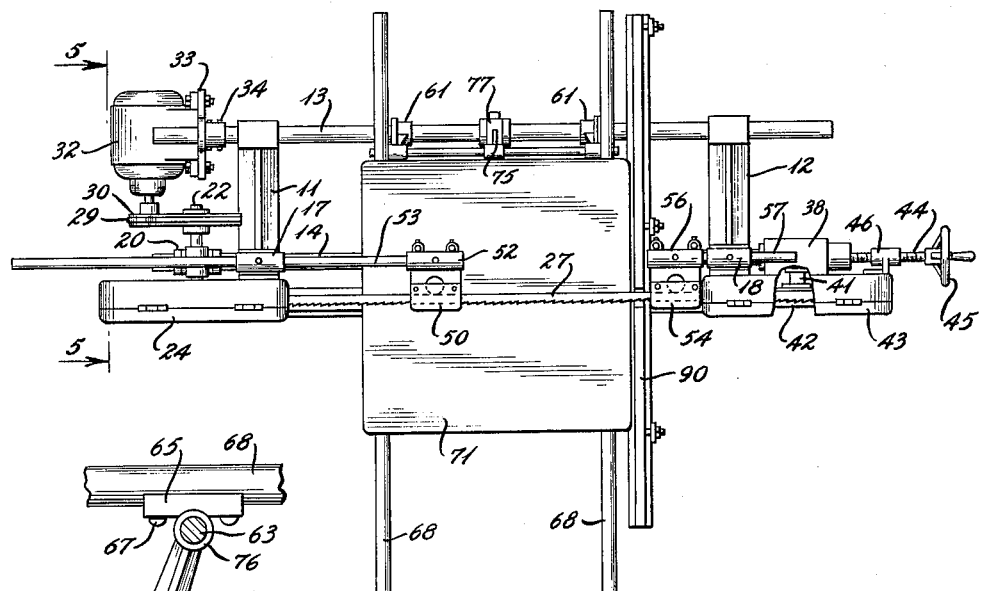
Figure 7:
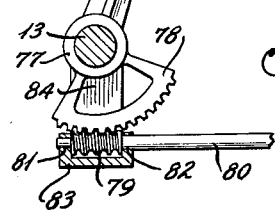

Other objects and advantages of the invention will be apparent from the following description taken in conjunction with the accompanying drawings wherein:

FIG. 1 is a front elevation illustrating one application of the invention;
FIG. 2, a top plan view;
FIG. 3, a rear elevation;
FIG. 4, a transverse section on the line 4—4 of FIG. 3;
FIG. 5, a transverse section on the line 5—5 of FIG. 2;
FIG. 6, a fragmentary longitudinal detail section on the line 6—6 of FIG. 4; and
FIG. 7, an enlarged fragmentary detail section on the line 7—7 of FIG. 6.

Briefly stated, the invention is a horizontal band saw and a table for supporting and presenting work to said saw, the table being adjustable both vertically and horizontally. The saw is an endless band saw driven by a motor mounted on the frame with an operating length disposed horizontally over the table. The table includes a base of spaced supporting frames connected by parallel rods which provide a mounting for mechanism by which the table may be vertically and horizontally adjusted. Such adjusting mechanism includes two pairs of parallel rocker arms, one pair carried by each of the rods which support the table and providing support at four spaced positions so that the table always will be in horizontal position, the structure including two pairs of rocker arms supporting parallel rails on which the table is slideable. Mechanism is provided for oscillating the rocker arms including an additional rocker arm and a segmental gear, a worm and shaft, and a hand wheel by which the table can be raised and lowered.

With continued reference to the drawings, the horizontal band saw of the present invention comprises a base 10 including frames 11 and 12 located at opposite ends of the saw and connected by parallel cross rods 13 and 14 on opposite sides thereof. The forward portion of the frames 11 and 12 have upwardly projecting reinforced members 15 and 16 respectively which terminate in horizontally disposed elongated sleeves 17 and 18.

A support member 20 (FIG. 5) is slideably mounted on one end of the rod 14 exteriorly of the frame member 11 and such support member extends upwardly and terminates in a bearing block 21 in which a shaft 22 is journaled. The forward end of the shaft 22 extends through an opening 23 in a housing 24 mounted on the reinforced member 15 by screws or other fasteners 25. A drive wheel 26 is mounted on the end of the shaft 22 within the housing 24 and receives thereon and drives an endless band saw blade 27.

The drive wheel 26 is driven by a pulley 28 mounted on the opposite end of the shaft 22 and such pulley is driven by a belt 29 from a pulley 30 mounted on a motor shaft 31 driven by a motor 32. The motor 32 is mounted on a support 33 by bolts or other fasteners 34 and the support 33 is slideably mounted on the cross rod 13 and held in fixed position thereon by set screws 34.

At the opposite end of the base a support member 37 (FIG. 3) is mounted on the cross rod 14 exteriorly of the frame 12.

A U-shaped member 38 is carried by the support 37 and is adapted to slideably support a pair of rods 39 on which is mounted a transverse bearing 40 with a shaft 41 journaled therein. An idler wheel 42 is mounted on the front end of the shaft 41 and receives thereon the endless band saw blade 27. The idler wheel 42 is contained within a housing 43 mounted on the reinforced member 16 of the frame 12. In order that the idler wheel 42 may be adjusted to increase or decrease the tension on the blade of the band saw, an adjusting screw 44 having an operating or hand wheel 45 is received within a threaded nut 46 on the rear of the housing 43 and such screw terminates in a slideable cross bar 47 to which the rods 39 are attached for moving the idler wheel 42 endwise.

The saw blade 27 is supported on one side of the object being cut by a saw guide 50 carried on a pair of vertically adjustable posts 51 in a holder 52 on one end of a rod 53 and such rod is slideably mounted in the sleeve 17 on the upper end of the reinforced member 15 of the frame 11. A second saw guide 54 is carried by a pair of vertically adjustable posts 55 in a holder 56 on the opposite side of the object being cut. The holder 56 is located on the end of a longitudinally disposed rod 57 and such rod is slideably mounted within the sleeve 18 on the reinforced member 16.

In order to support the work for movement into contact with the saw blade 27, a vertically adjustable frame 60 (FIGS. 3 and 4) is provided having spaced pairs of parallel rocker arms 61 and 62 which form a parallelogram, such arms being rotatably mounted on the parallel cross rods 13 and 14 respectively. The arms 61 are connected by a rod 63 and the arms 62 are connected by a rod 64. A bearing 65 is rotatably mounted on the rod 63 exteriorly of each of the arms 61 and a bearing 66 is rotatably mounted on the rod 64 exteriorly of each of the arms 62. The bearings 65 and 66 on each side of the frame 60 are connected by fasteners 67 to a rail or slideway 68. The rails 68 support slides 69 on which are mounted uprights 70 which support a table or work surface 71 substantially parallel to the saw blade 27.

In order to raise and lower the table 71, a link 75 is employed having a bearing 76 at its upper end rotatably mounted centrally of the rod 63 and the lower end of such link having a bearing 77 rotatably mounted on the cross rod 13. The bearing 77 supports a segmental worm gear 78 which engages a worm 79 mounted on a shaft 80.

The shaft 80 is journaled in openings 81 and 82 in a housing 83 supported by plates 84 suspended from the cross rod 13. The shaft 80 extends through a bearing 85 connected by a support 86 to the cross rod 14 and the forward end of the shaft 80 is connected to an operating hand wheel 87 by which the shaft may be rotated to turn the segmental worm gear and rotate the link 75 about the cross rod 13 to raise and lower the frame 60.

If desired, the band saw may have a fixed guide plate 90 located both parallel and adjacent to the table 71. Such guide plate is mounted on a bracket 91 by screws or other fasteners 92 and the bracket is supported on arms 93 carried by the cross rods 13 and 14.

In the operation of the device, the table 71 may be raised or lowered to the desired position relative to the saw blade 27 by operating the hand wheel 87. Rotation of the hand wheel causes rotation of the shaft 80, to which it is fixed, and also causes rotation of the worm 79 on the opposite end of such shaft. The worm moves a segmental worm gear 78 which in turn rotates the link 75 about the cross rod 13. The opposite end of the link 75 is rotatably connected to the rod 63 of the vertically adjustable frame 60 on which rails 68 are mounted. Due to the table 71 being mounted for endwise movement on guides 69 which slide along the rails 68, an object to be cut may be placed on the table and the latter moved endwise to cause the object to come into contact with the saw blade substantially at right angles so that the blade will not warp or lead and cut an uneven surface on the object.

It will be apparent that a relatively simple horizontal band saw is provided in cooperation with a vertically adjustable, slideable table which is raised and lowered by the arms 61 and 62 which form a parallelogram so that the table is slideable beneath the saw blade at any elevation within its limits.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination of a horizontal band saw and a work supporting table having a work surface adjustable vertically and horizontally relative to said band saw, mounting means therefor comprising a pair of spaced frames, spaced parallel cross rods connecting said frames, a band saw carrying wheel slideably mounted on one of said cross rods, a cooperating adjustable idler wheel mounted in opposition to said band saw carrying wheel on said one cross rod, a motor connected to drive said band saw carrying wheel, an endless band saw blade carried by said wheels with an operating length horizontally disposed over said work surface, adjustable blade guide means slideably mounted on said frame, a pair of spaced parallel arms mounted on each of the cross rods, a second rod carried by each pair of said parallel arms in spaced relation to said cross rods, a pair of spaced parallel rails connected to said second rods and disposed transversely thereof, a work supporting table slideably mounted on said rails to be moved along the same, a link pivotally connected to one of said second rods and one of said cross rods, a segmental gear carried by said link, an operating shaft supported by said cross rods, a worm carried by said operating shaft in a manner to rotate said segmental gear, and an operating handle on said operating shaft whereby said work supporting table may be raised and lowered relative to said saw and remain parallel thereto at all times.

2. The combination of a horizontal band saw and a work supporting table having a work surface adjustable vertically and horizontally relative to said band saw, mounting means therefor comprising a pair of spaced frames, spaced parallel cross rods connecting said frames, a band saw carrying wheel slideably mounted on one of said cross rods, a cooperating adjustable idler wheel mounted in opposition to said band saw carrying wheel on said one cross rod, a motor connected to drive said band saw carrying wheel, an endless band saw blade carried by said wheels with an operating length horizontally disposed over said work surface, adjustable guide means slideably mounted on said frame, a pair of spaced parallel arms mounted on each of said cross rods, a second rod carried by each pair of said parallel arms in spaced relation to the cross rods, a pair of spaced parallel rails connected to said second rods and disposed transversely thereof, a work supporting table slideably mounted on said rails to move along the same, and means for raising and lowering said work supporting table and for sliding the same on said rails.

3. A combination band saw and work support comprising spaced frames, cross rods connecting said frames, a pair of spaced rocker arms mounted on each of said cross rods, a pair of rails carried by said rocker arms at right angles and in spaced relation to the cross rods on which said rocker arms are mounted, a table having a work surface slideably mounted on said rails and adapted to be raised and lowered by the swinging of said rocker arms while kept in horizontal position at all times, band saw carrying wheels slidably mounted at opposite ends of one of said cross rods, a saw blade carried by said wheels and having a horizontal portion disposed lengthwise of said machine in the path of movement of said table, means for driving said saw, an operating rocker arm intermediate one pair of said rocker arms and having a segmental gear fixed thereto, a worm engaging said segmental gear, an operating shaft supporting said worm, and a hand wheel rotating said operating shaft to oscillate said segmental gear and associated rocker arm for raising and lowering said table.

4. The combination of a horizontally disposed band saw and a movable work table comprising spaced ground engaging frames, parallel cross rods connecting said frames and forming a base, band saw carrying wheels slidably mounted at opposite ends of one of said cross rods, an endless band saw blade carried by said wheels and having its upper run disposed generally horizontally above the work table, a pair of spaced parallel rocker arms rotatably mounted on each of said cross rods intermediate said frames, each pair of rocker arms being connected in parallel spaced relation to said cross rods, a pair of spaced parallel rails connected to said pairs of rocker arms and disposed transversely of said cross rods, slides carried by said rails, a work support table mounted on said slides and movable lengthwise along said rails, means for rotating said rocker arms for selectively raising and lowering said work supporting table, and means for driving said saw whereby said work supporting table may be raised and lowered in parallel spaced relation relative to said saw and moved transversely thereof to perform the cutting operation.

References Cited in the file of this patent

UNITED STATES PATENTS

| | | |
|---|---|---|
| 326,640 | Greenlee | Sept. 22, 1885 |
| 1,112,822 | Mershon | Oct. 6, 1941 |
| 2,471,014 | Trebert | May 24, 1949 |
| 2,656,861 | Verret | Oct. 27, 1953 |

FOREIGN PATENTS

| | | |
|---|---|---|
| 1,016,007 | Germany | Sept. 19, 1957 |